United States Patent [19]
Emery et al.

[11] Patent Number: 5,866,854
[45] Date of Patent: Feb. 2, 1999

[54] CALIBRATING DEVICE FOR A BALANCE

[75] Inventors: Jean-Christophe Emery, Schwerzenbach; Thomas Glättli, Jona, both of Switzerland

[73] Assignee: Mettler-Toledo AG, Greifensee, Switzerland

[21] Appl. No.: 790,928

[22] Filed: Jan. 29, 1997

[30]     Foreign Application Priority Data

Feb. 12, 1996 [DE] Germany ................. 196 05 087.1
Aug. 22, 1996 [DE] Germany ................. 296 14 601 U

[51] Int. Cl.⁶ .................. G01G 19/52; G01G 3/14; G01G 3/08
[52] U.S. Cl. ................. 177/50; 177/210 EM; 177/229
[58] Field of Search ............ 177/50, 210 EM, 177/229; 73/1.13

[56]         References Cited

U.S. PATENT DOCUMENTS

| | | | |
|---|---|---|---|
| 4,065,962 | 1/1978 | Shoberg | 73/141 A |
| 4,338,825 | 7/1982 | Amlani et al. | 73/862.65 |
| 4,505,345 | 3/1985 | Jetter | 177/229 |
| 4,799,561 | 1/1989 | Komoto | 177/229 |
| 4,890,246 | 12/1989 | Oldendorf et al. | 177/210 EM |
| 5,340,951 | 8/1994 | Hungerbuhler et al. | 177/210 EM |

*Primary Examiner*—Lincoln Donovan
*Assistant Examiner*—Anh Mai
*Attorney, Agent, or Firm*—Friedrich Kueffner

[57]              ABSTRACT

A calibrating device for a balance including a load receiving unit for loads to be weighed, a load measuring unit and a lever mechanism serving for the force transmission between the load receiving unit and the load measuring unit, wherein the lever mechanism is coupled to the load receiving unit through a coupling area on an input side and to the load measuring unit through a coupling area at an output side, and wherein the lever mechanism further includes an additional coupling area, separate from the coupling areas on the input and output sides, for releasably coupling a calibrating force which is uncoupled during the normal weighing operation. The balance further includes a parallelogram guide means with two parallel guide members whose first ends are connected to each other through a deflectable member which is guided so as to be movable parallel to the direction of the calibrating force and which serves for the releasable coupling of the calibrating force, and whose second ends are connected to each other through a stationary member, wherein the coupling area serving for the calibration is connected to the deflectable member.

28 Claims, 3 Drawing Sheets

CALIBRATING DEVICE FOR A BALANCE

BACKGROUND OF THE INVENTION

1. Field of the Invention

The present invention relates to a calibrating device for a balance including a load receiving unit for loads to be weighed, a load measuring unit and a lever mechanism serving for the force transmission between the load receiving unit and the load measuring unit, wherein the lever mechanism is coupled to the load receiving unit through a coupling area on an input side and to the load measuring unit through a coupling area at an output side, and wherein the lever mechanism further includes an additional coupling area, separate from the coupling areas on the input and output sides, for releasably coupling a calibrating force which is uncoupled during the normal weighing operation.

2. Description of the Related Art

In a calibrating device of the above-described type known from DE 26 09 560 A1, an approximately V-shaped receiving means for a calibrating weight is provided in a lever serving for the stepping down of the force between the load receiving unit and the load measuring unit. For carrying out the calibration, a calibrating weight is placed in the interior of the balance in the receiving means, wherein the calibrating weight is uncoupled from the lever during the normal weighing operation. In order to ensure a calibration of the balance which is as accurate as possible, the receiving means is arranged over the entire weighing area of the balance with a relatively small calibrating weight on the lever in such a way that the force of the calibrating weight acts fully on the load measuring unit, i.e., without stepping down of the force.

For utilizing the absolute accuracy of a balance achievable as a result of resolution, which may be 0.1 g or even higher when using a 32 kg weighing cell, it is necessary when using the known calibrating device to place the calibrating weight, in longitudinal direction of the lever as well as in a direction perpendicular to the longitudinal direction, in the receiving means with a positional accuracy in the order of magnitude of $10^{-3}$ mm on the longitudinal axis of the lever. For ensuring such a positional accuracy, an extremely complex mechanism is required for releasably coupling the calibrating weight. If the calibrating weight is coupled with less accuracy, the absolute accuracy of the balance determined by the resolution cannot be realized.

SUMMARY OF THE INVENTION

In view of the problem described above, it is the primary object of the present invention to provide a calibrating device of the above-mentioned type which provides a high calibrating accuracy while being mechanically simple.

In accordance with the present invention, the balance includes a parallelogram guide means with two parallel guide members whose first ends are connected to each other through a deflectable member which is guided so as to be movable parallel to the direction of the calibrating force and which serves for the releasable coupling of the calibrating force, and whose second ends are connected to each other through a stationary member, wherein the coupling area serving for the calibration is connected to the deflectable member.

The parallelogram guide means serving for coupling the calibrating force significantly reduces the sensitivity to moments when the calibrating force is introduced. A substantial reduction of the dependence of the force transmitted from the coupling area serving for the releasable coupling to the load measuring unit on the position of the point where the calibrating force acts is achieved.

In the case of a 32 kg weighing cell with a lever mechanism serving for the stepping down of the force to be used as an example, with the use of the calibrating device according to the present invention with a calibrating weight serving for producing the calibrating force of 400 g for calibrating the weighing cell over its entire weighing range, it is possible to achieve the absolute measuring accuracy in the order of magnitude of an indicated resolution accuracy of 0.1 g already with a positional accuracy of the calibrating weight in a horizontal plane in the order of magnitude of $10^{-1}$ mm. Such a narrow positional accuracy can be achieved already with a comparably simple arrangement for releasably coupling the calibrating force to the deflectable member of the parallelogram guide means. Consequently, even though a parallelogram guide means is used which appears complicated at first glance and serves solely for coupling a calibrating force, it is possible to achieve an overall simplification of the mechanical configuration of a calibrating device necessary for achieving or maintaining the attainable absolute accuracy of a balance.

As already explained above, in the calibrating device according to the invention, the calibrating force can be produced particularly simply by means of a calibrating weight which can be coupled to the deflectable member. For calibrating the balance in different measuring ranges, it is also conceivable to provide the calibrating device with several calibrating weights which can be coupled independently of each other to the deflectable member.

A particularly compact configuration of the calibrating device according to the present invention can be achieved if a support unit is arranged at the deflectable member, wherein the support unit includes receiving areas for the calibrating weight extending essentially transversely of the parallelogram plane of the parallelogram guide means. This arrangement makes it possible to couple the calibrating weight next to the guide members, i.e., in a plane extending parallel to the parallelogram plane. This makes it possible to minimize an increase of the length of the calibrating device by coupling the calibrating weight, wherein this length is generally is predetermined by the length extension of the guide members and the measuring cell.

Independently of the fact that the parallelogram guide means significantly reduces the requirements with respect to accuracy, a well defined positioning of the calibrating weight is useful. For this purpose, the support unit is advantageously provided with a locking element for the calibrating weight.

The locking element may be particularly simple in the form of a recess and/or a projection if the calibrating weight is provided with a complimentary projection engagable in the recess and/or with a complimentary recess engagable in the projection.

A well-defined positioning of the calibrating weight in longitudinal direction of the guide members can be achieved in a particularly simple manner if the support unit includes two preferably rod-shaped support elements which extend essentially parallel to each other and are spaced apart from each other in longitudinal direction of the guide members.

Such a support element arrangement assures an automatic calibration weight positioning in longitudinal direction of the guide members if the calibrating weight can be placed at least partially in the space between the support elements and rests in the coupled state against both support elements with a surface element which extends transversely of a plane determined by the support elements. For this purpose, the calibrating weight can be constructed, for example, in the form of a circular cylinder with a diameter which exceeds the spacing between the two support elements.

In the case of rod-shaped support elements, the locking element may be constructed in a particularly simple manner in the form of at least one web extending coaxially relative to the longitudinal axis of at least one of the support elements, if the calibrating weight has a recess corresponding to the axially sectional shape of the web, wherein the web preferably has the axially sectional shape of a triangle with a side thereof contacting the rod.

When the circular cylindrical calibrating weight already described above is used, the recess is formed preferably in the shape of a circumferential groove which is provided in the outer surface of the cylinder and preferably has the form of a triangle with a tip pointing toward the cylinder axis. Alternatively, it is also conceivable to construct the locking element in the form of a groove and to provide the calibrating weight with a circular web which compliments the groove.

A holder can be used for coupling the calibrating weight. The holder serves in a first position thereof for holding the calibrating weight in a position separated from the deflectable member and being adjustable for coupling the calibrating weight to the deflectable member in a second position. The holder advantageously has a contact area on which the calibrating weight can rest against the direction of gravity. The contact area of the holder advantageously has a surface area, for example, in the form of a groove, which compliments a projection of the calibrating weight, for supporting the calibrating weight in the first position transversely of the direction of gravity.

For separating the calibrating weight from the deflectable member, the holder preferably can rest against the calibrating weight above and/or below the support elements and therebetween.

For adjusting the holder between its first and second positions, the holder can be pivoted about an axis preferably extending perpendicularly relative to the parallelogram plane or is displaceable in the direction of gravity.

The calibrating weight can be secured particularly reliably in the first position thereof if the holder is constructed essentially U-shaped and the calibrating weight is held in the first position thereof between the legs of the U-shaped holder.

A particularly compact construction can be achieved if the holder is constructed essentially L-shaped, wherein one of the legs of the L-shaped holder rests in the first position against the underside of the calibrating weight.

The space required by a calibrating device of this type is reduced if the leg of the holder resting against the underside of the calibrating weight extends in the second position essentially between the support elements.

In addition, for achieving a particularly compact arrangement of the calibrating device according to the present invention, it is especially preferred that a portion of the deflectable member extends between the guide members.

For ensuring a sufficient bending stiffness of the individual elements of the parallelogram guide means while simultaneously constructing the calibrating device as compact as possible, it is particularly advantageous if the portion of the deflectable member extending between the guide members is at least over portions thereof separated from the guide members by a material-free area in the form of a thin cut line. In view of optimizing the bending stiffness, this makes it possible to maximize the material thickness of the deflectable member and/or the guide members, while avoiding an undesirable contact between the deflectable member and the guide members.

For maximizing the bending stiffness of the portion of the deflectable member extending between the guide members it is also particularly advantageous if each of the guide members has in the known manner two bending points which are spaced apart from each other in the longitudinal direction of the guide members, wherein the bending points of one guide member are located opposite the bending points of the other guide member, wherein at least one of the bending points is on the side facing the opposite bending point defined by a material-free area which on its other side borders the deflectable member and has the form of a portion of a thin cut line which convexly arches toward this bending point. As a result, it is possible to construct with a particularly large material thickness the portion of the deflectable member between the bending point defined by the material-free area in the form a thin cut line and the opposite bending point. The resulting high bending stiffness of this portion can be utilized in an advantageous manner for the problem-free introduction of the weight force of a calibrating weight resting on a support unit arranged at this portion.

For ensuring a particularly reliable introduction of the calibrated force, it is particularly advantageous if the portion serving for coupling the calibrating force is connected in an articulated manner, on the one hand, to the lever mechanism through one bending point and, on the other hand, to the deflectable member through another bending point.

For increasing the bending stiffness of the portion of the lever mechanism adjacent the portion serving for coupling the calibrating force and/or the portion of the deflectable member adjacent the portion serving for coupling the calibrating force, it is particularly advantageous if at least one of the bending points provided for connecting the portion serving for coupling the calibrating force is defined at least on one side by a material-free area in the form of a thin cut line.

In order to be able to use calibrating weights which can be handled as well as possible in balances having a large force stepdown ratio or step-up ratio, it is particularly advantageous if the transmission ratio of the force transmission between the coupling area on the input side and the coupling area on the output side differs from the transmission ratio of the force transmission between the coupling area serving for coupling the calibrating weight and the coupling area on the output side. This arrangement makes it possible that, for example, the entire weighing range of a 32 kg weighing cell with a step-down ratio of 1:100 can be achieved with the use of a calibrating weight of 320 g, when the calibrating weight acts with its full force on the load measuring unit.

In a lever mechanism having at least two levers, it is particularly advantageous for achieving calibrating weights which can be handled as simply as possible to connect the coupling area serving for calibration to a lever connected following a lever including the coupling area on the input side.

In order to achieve a load measurement which is positionally independent as much as possible, it is particularly advantageous if the load receiving unit also includes a load parallelogram guide means with two load guide members extending parallel to each other, wherein the load guide members are connected to each other at one ends by a load introducing member which is deflectable parallel and which are connected at their other ends through a stationary post.

In a load receiving unit arranged in this manner, the balance can be constructed in a particularly compact manner if a portion of the post extends between the load guide members and serves as support for the lever mechanism which is also arranged essentially between the load guide members.

The space requirement of such a device is further reduced if the post simultaneously forms the stationary member of the parallelogram guide means of the calibrating device, wherein it is particularly advantageous if the parallelogram guide means of the calibrating device is arranged essentially between the load guide members.

An increase of the bending stiffness of the guide members of the parallelogram guide means and/or individual elements of the lever mechanism can be achieved if at least one guide member of the parallelogram guide means of the calibrating device is separated from the post and/or lever mechanism by a material-free area which over at least portions thereof has the form of a thin cut line.

Similarly, an increase of the bending stiffness of the individual elements of the lever mechanism and of the load receiving unit can be achieved if the lever mechanism is separated from the load receiving unit by a material-free area which at least over portions thereof has the form of a thin cut line.

If the load receiving unit, the lever mechanism and the parallelogram guide means are constructed in one piece, the calibrating device according to the present invention can be manufactured particularly easily, for example, with the use of the method of spark erosion by means of an erosion wire. In addition, a manufacture with the use of a water jet and/or a laser beam is possible.

Concerning the formation of material-free areas in the form of thin cut lines mentioned repeatedly hereinabove and the resulting advantages, reference is expressly made to DE 41 19 734 A.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
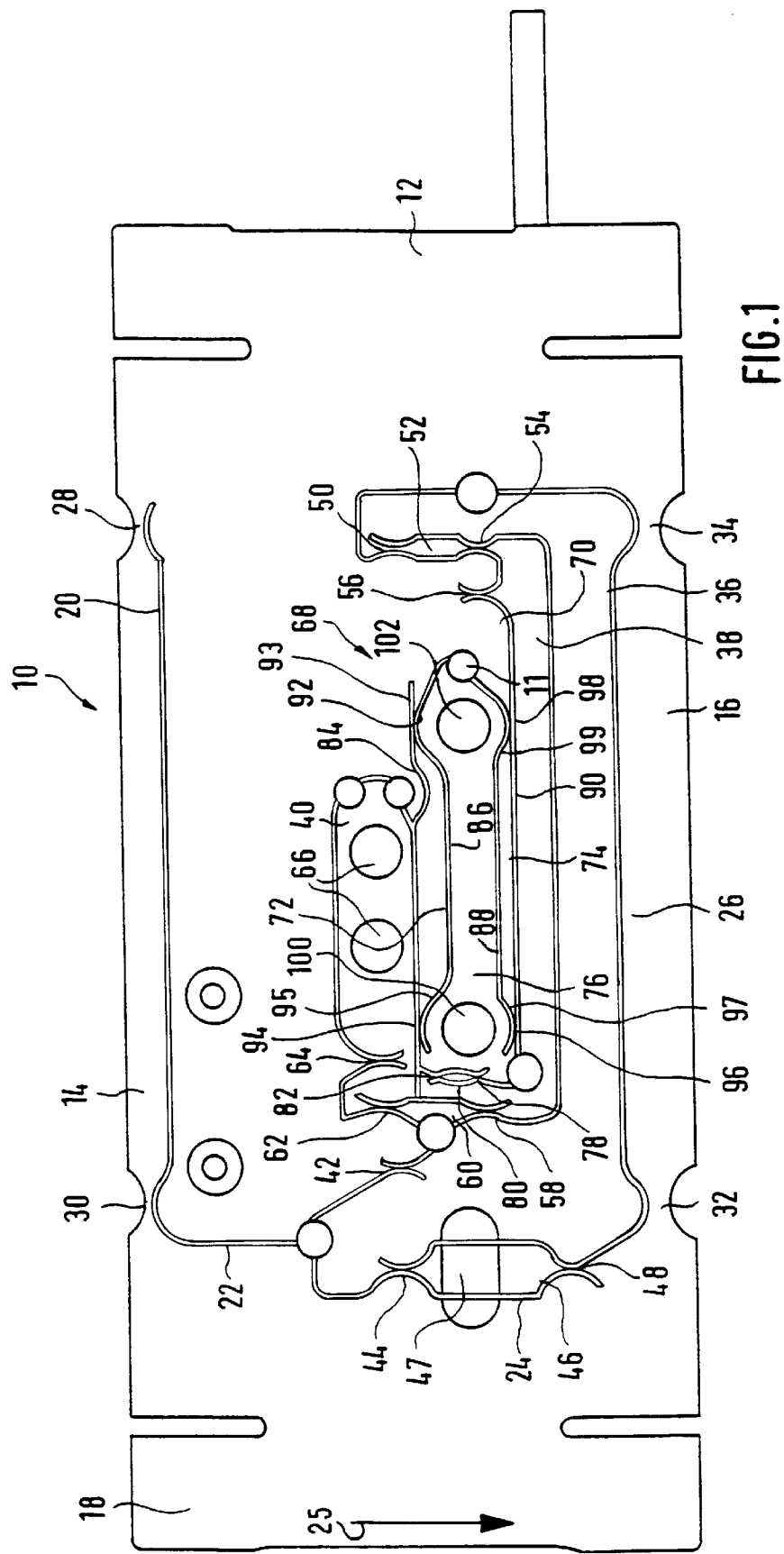
FIG. 1 is a side view of a weighing cell provided with a calibrating device according to the present invention.

The weighing cell illustrated in FIG. 1 of the drawing includes a load receiving unit 12, 14, 16, 18, a lever mechanism including three levers, i.e., a first lever 36, a second lever 38 and a third lever 40, and a calibrating device 68 according to the present invention. These elements are formed from a single piece of an essentially parallelepiped-shaped material block 10. For this purpose, material-free areas in the form of thin cut lines are formed in the material block by the method of spark erosion by means of an erosion wire. For threading-in the erosion wire, a hole 11 is formed in the material block 10. A rod, not shown, can be inserted into the hole 11 for blocking, during the assembly, the parallelogram guide means of the calibrating device according to the present invention to be explained later.

Suitable materials for the single-piece material block 10 are, for example, aluminum alloys. However, numerous other materials are also conceivable, for example, steel alloys or composite materials.

The load receiving unit of the weighing cell shown in FIG. 1 includes a load parallelogram guide means composed of a stationary post 12, an upper load guide member 14, a lower load guide member 16, and a load introduction member 18 which is guided so as to be capable of parallel displacement. The upper load guide member 14 is separated through a material-free area 20 in the form of a thin cut line from a portion of the post 12 extending between the upper load guide member 14 and the lower load guide member 16. Similarly, the lower load guide member 16 is separated through a material-free area in the form of a thin cut line 26 from the first lever 36 of the lever mechanism to be explained later. On its side facing away from the post 12, the load introduction member 18 is bordered by a side surface of the material block 10, while on its side facing the post 12 the load introduction member 18 is separate from the post 12 or a first coupling member 46 through material-free areas 22 and 24 in the form of thin cut lines.

The load guide members 14 and 16 are connected to each other through the post 12 at their one ends and through the load introduction member 18 at their other ends. For this purpose, the upper load guide member 18 is connected in an articulated manner, on the one hand, through a bending point 28 to the post 12 and, on the other hand, through a bending point 30 to the load introduction member 18. Similarly, the lower load guide member 16 is connected in an articulated manner, on the one hand, through a bending point 34 to the post 12 and, on the other hand, through a bending point 32 to the load introduction member 18. The bending points 28–34 are defined at their sides facing the interior of the material block 10 by portions in the form of outwardly directed convex arks of the material-free areas 20 or 26, respectively. At the outer surfaces of the material block 10, the bending points 28–34 are formed by convex indentations of the material block 10 located opposite the convexly arched portions of the material free areas 20 and 26.

The lever mechanism including the first lever 36, the second lever 38 and the third lever 40 for stepping down a force acting in the direction of arrow 25 on the load introduction member 18 is arranged between the upper load guide member 14 and the lower guide member 16. The first lever 36 supported in a suspended manner in a bending point 42 at the post 12 is connected on one side of the bending point 42 through a bending point 44, the first coupling member 46 and a bending point 48 to the load introduction member 18 and on the other side of the bending point 42 through a bending point 50, a second coupling member 52 and a bending point 54 to the second lever 38. In the weighing cell illustrated in FIG. 1, the distance between the bending point 42 serving for supporting the first lever in a suspended manner and the bending point 44 serving for connecting the first lever 36 to the first coupling member 46 is smaller than the distance between the bending point 42 and the bending point 50 serving for connecting the first lever 36 to the second coupling member 52, so that the first lever 36 causes a stepping down of the force acting on the load introduction member 18.

The first coupling member 46 is provided over its length between the bending points 48 and 44 with recesses 47 starting at the principal planes of the material block 10. This reduces the material thickness of the first coupling member 46 perpendicularly of these principal planes. Because of the resulting flexibility of the first coupling member 46 in the direction extending perpendicular to the parallelogram plane of the load parallelogram guide means, any possible slight tilting of the load introduction member 18 due to eccentric introduction of the force to be measured is absorbed by the first coupling member 46, and is not transmitted to the first lever 36.

The force transmitted by the first lever 36 from the load introduction member 18 to the second lever 38 suspended at a bending point 56 from the post 12 is transmitted from the second lever 38 through a bending point 58, a third coupling member 60 and a bending point 62 to the third lever 40 which is suspended at a bending point 64 from the post 21. The distance between the bending point 56 serving for the suspended support of the second lever 38 at the post 12 and the bending point 54 serving for connecting the second lever 38 to the first lever 36 on one side of the bending point 56 is smaller than the distance between the bending point 56 and the bending point 58 serving for connecting the second lever 38 to the third lever 40 on the other side of bending point 56. Consequently, the second lever 38 produces another stepping down of the force acting on the load introduction member 18 and transmitted through the first lever 36 to the second lever 38.

The third lever 40 is provided with cutouts 66 on the side of the bending point 64 serving for suspending the third lever 40 on the post 12 opposite the bending point 62 serving for connecting the third lever 40 to the second lever 38. These cutouts serve as fastening holes for a cantilever, not shown, which projects beyond the material block 10 and can support, for example, a coil interacting with a permanent magnet of a magnetic force compensation unit serving as load measuring unit. Alternatively, it is also possible to use a load measuring unit in the form of a string which can be excited into vibrations or a wire strain gauge cell. Again, the distance between the bending point 64 serving for suspending the third lever 40 on the post 12 and the bending point 62 serving for connecting the third lever 40 to the third coupling member 60 or the second lever 38 on one side of the bending point 64 is smaller than the distance between the cutouts 66 or the coil arranged on the cantilever secured in the cutout 66 on the other side of the bending point 64. Consequently, the third lever 40 also produces another stepping down of the force which acts on the load introduction member 18 and is transmitted through the first and second levers 36 and 38 to the third lever 40.

As already discussed above, the elements of the weighing cell illustrated in FIG. 1 and explained thus far are formed in one piece and are separated from each other by material-free areas in the form of thin cut lines. This minimizes the material removal required for forming these elements and, consequently, ensures that the strength of the individual elements is maximized. By maximizing the material thickness, particularly in the vicinity of the bending points, a maximum strength and load-bearing capacity are achieved with minimal structural volume. All bending points discussed thus far and serving for connecting the coupling members and for suspending the levers are formed by arc-shaped portions of the material-free areas in the form of thin cut lines, wherein the arc-shaped portions are arranged opposite each other and compliment each other. The bending points 42, 44 and 50, the bending points 54, 56 and 58, and the bending points 62 and 64 are each arranged in a horizontal plane. Another arrangement, particularly for the bending points 42, 44, 50, is conceivable.

For transmitting a calibrating force serving for calibrating the weighing cell to one of the levers of the lever mechanism, i.e., the second lever 38 in the embodiment shown in FIG. 1, a parallelogram guide means 68 is formed in the space defined between the second lever 38, the third lever 40 and the post 12. This parallelogram guide means 68 includes a stationary member 70 formed by a portion of the post 12, an upper guide member 72, a lower guide member 74 and a member 76 which is guided so as to be capable of parallel displacement. The guide members 72 and 74 are connected to each other at their one ends through the stationary member 70 and at their other ends through the deflectable member 76. For coupling a force acting on the deflectable member 76, the deflectable member 76 is connected through a bending point 78, a fourth coupling member 80 and a bending point 82 to a portion of the second lever 38 adjacent the third coupling member 60. Consequently, a force acting on the deflectable member 76 is subjected to stepping down when being transmitted to the load measuring unit which is smaller than the stepping down of the force acting on the load introduction member 18.

The upper guide member 72 of the parallelogram guide means 68 is defined by a material-free area 84 in the form of a thin cut line which on its other side defines the third lever 40 and the post 12. At its bottom side, the upper guide member 72 of the parallelogram guide means 68 is defined by a material-free area 86 which also has the form of a thin cut line and which on its other side defines a portion of the deflectable member 76 extending between the guide members 72 and 74. The lower guide member 74 is defined at its upper side by a material-free area 88 which also has the form of a thin cut line and which on its other side defines the underside of the portion of the deflectable guide member 76 extending between the guide member 72 and 74. The bottom side of the lower guide member 74 is defined by a material-free area 90 whose other side defines the second lever 38. Similarly, the fourth coupling member 80 is separated from the deflectable member 76, on the one hand, and from the end portion of the second lever 38 facing the third coupling member 60, on the other hand.

For forming the bending points 92 and 94 which are at the ends in longitudinal direction of the upper guide member 72, the material-free area 86 defining the bottom of the guide member 72 has two convex arcs 93 and 95 which are directed toward the material-free area 84 and are spaced apart from each other in longitudinal direction of the parallelogram guide means 68. Similarly, for forming the bending points 96 and 98, the material-free area 88 forming the upper side of the guide member 74 is provided with convex arcs 97 and 99 which are directed toward the material-free area 90 and are spaced apart from each other in longitudinal direction of the parallelogram guide means 68.

Between the arcs 93 and 99 and between the arcs 95 and 97, the deflectable member 96 has a particularly large material thickness and, thus, a particularly high strength. Therefore, cutouts 100 and 102 are formed precisely in these areas of the deflectable member 76, wherein the cutouts 100 and 102 serve to receive a support unit for a calibrating weight extending transversely of the parallelogram plane of the parallelogram guide means 68.

The parallelogram guide means 68 makes it possible that the force transmitted through the fourth coupling member 80 serving a coupling area for the calibrating force from the deflectable member 76 to the second lever 38 is essentially independent of the position of the calibrating weight acting on the deflectable member. Therefore, a mechanism used for releasably coupling the calibrating weight to the deflectable member 76 can be particularly easily formed without impairing the calibration accuracy. Examples of embodiments of such mechanisms are illustrated in FIGS. 2a, 2b, 3a and 3b.

Figure 2A:
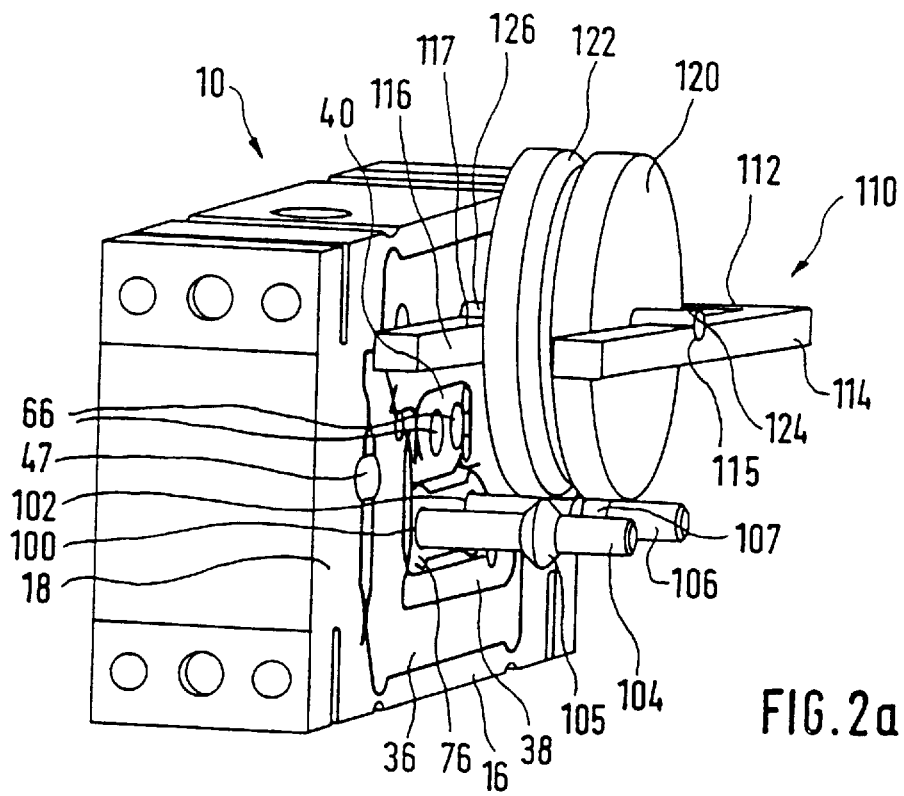
FIGS. 2a an 2b arperspective views of a first embodiment of a holder for releasably coupling a calibrating weight to the weighing cell of FIG. 1, shown in two different positions of operation.
Figure 2B:
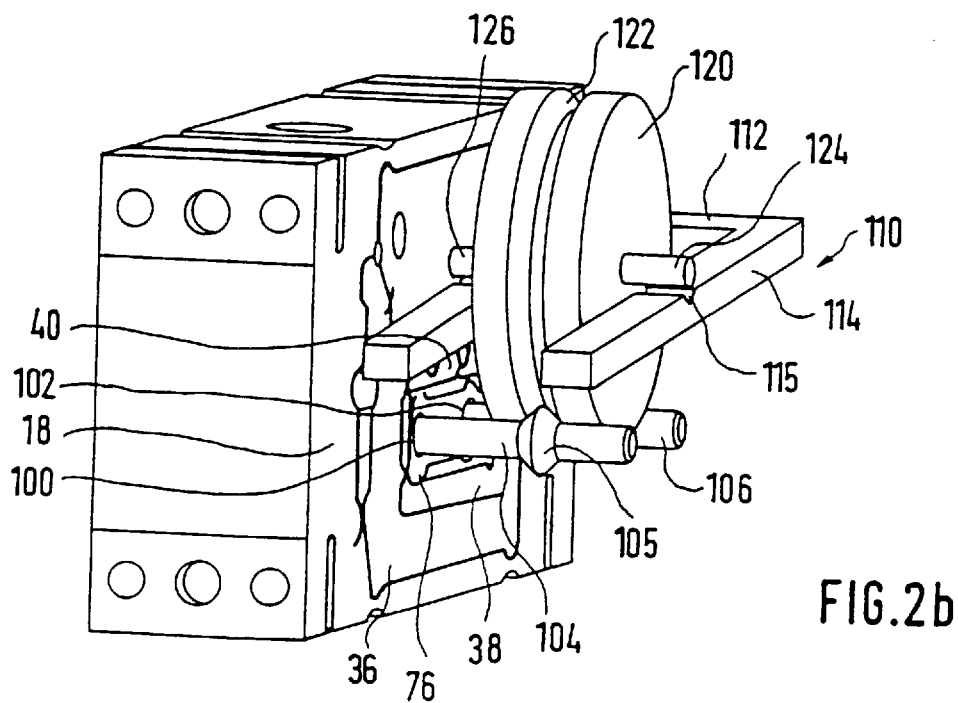

In the embodiment illustrated in FIGS. 2a and 2b, the mechanism essentially includes an approximately U-shaped holder 110 which can be pivoted between a first position illustrated in FIG. 2a and second position shown in FIG. 2b. In the first position shown in FIG. 2a, the calibrating weight 120 is held between two legs 114 and 116 of the holder 110 which extend from a base 112 extending approximately perpendicularly to the principal plane of the material block 10 and approximately parallel to the principal plane of the material block 10, in a position raised above the deflectable member 76 and, thus, above the lever mechanism formed by the levers 36, 38 and 40. For this purpose, the calibrating weight 120 which is disk-shaped and constructed essentially circular cylindrically, is provided with a shaft extending approximately along the cylinder axis, wherein, in the position of the holder 110 shown in FIG. 2a, the free ends 124 and 126 of the shaft are received in recesses 115 and 117 in the legs 114 and 116. Thus, together with the recesses 115 and 117, the free ends 124 and 126 form a locking means for the calibrating weight 120 in the position raised from the weighing cell.

For coupling the calibrating weight 120 to the lever mechanism through the deflectable member 76, the holder 110 is pivoted into the position shown in FIG. 2b. In this position, the holder 110 is completely separated from the calibrating weight 120. The calibrating weight now rests on the support unit of the deflectable member 76 which is formed by two rods 104 and 106 received in the cutouts 100 and 102 of the deflectable member 76. In the embodiment of FIGS. 2a and 2b, the rods 104 and 106 extend approximately perpendicularly to the principal plane of the material block 10. Therefore, the calibrating weight 120 coupled to the lever mechanism is arranged next to the material block 10 so as to extend approximately parallel to the parallelogram plane of the parallelogram guide means. The elements serving for the calibration of the balance do not result in a significant increase of the height and length dimensions of the weighing cell.

In its position coupled to the lever mechanism, a lower portion of the calibrating weight, which has a diameter which exceeds the distance between the rods 104 and 106, is located between the rods 104 and 106, wherein the calibrating weight 120 rests with surface areas having downwardly pointing surface normals against the rods 104 and 106. As a result, a precise positioning of the calibrating weight 120 in longitudinal direction of the guide members 72 and 74 is achieved.

For a precise positioning of the calibrating weight 120 in longitudinal direction of the rods 104 and 106, webs 105 and 107 are provided on the rods 104 and 106, wherein the webs 105 and 107 are formed in axial section so as to complement a groove 122 which extends circumferentially on the outer surface of the calibrating weight 120 having a circular cylindrical shape. In the embodiment shown in FIGS. 2a and 2b, the webs 105 and 107 are formed in axial section in the form of a triangle one side of which rests against the rods 104 and 106. Consequently, when the calibrating weight is displaced in the first position shown in FIG. 2a in longitudinal direction of the rods 104 and 106, the calibrating weight is guided without tilting into the second position illustrated in FIG. 2b. The distance between the webs 105 and 107 and the principal surface of the material block 10 facing the webs 105 and 107 as well as the dimension of the calibrating weight 120 in longitudinal direction of the rods 104 and 106 are advantageously selected in such a way that, in the position shown in FIG. 2b, the calibrating weight 120 and the holder 110 cannot come into contact with a cantilever, not shown, which is secured in the cutouts 66 of the third lever 40 and extends to the surface of the post 12 opposite the load introduction member 19.

Figure 3A:
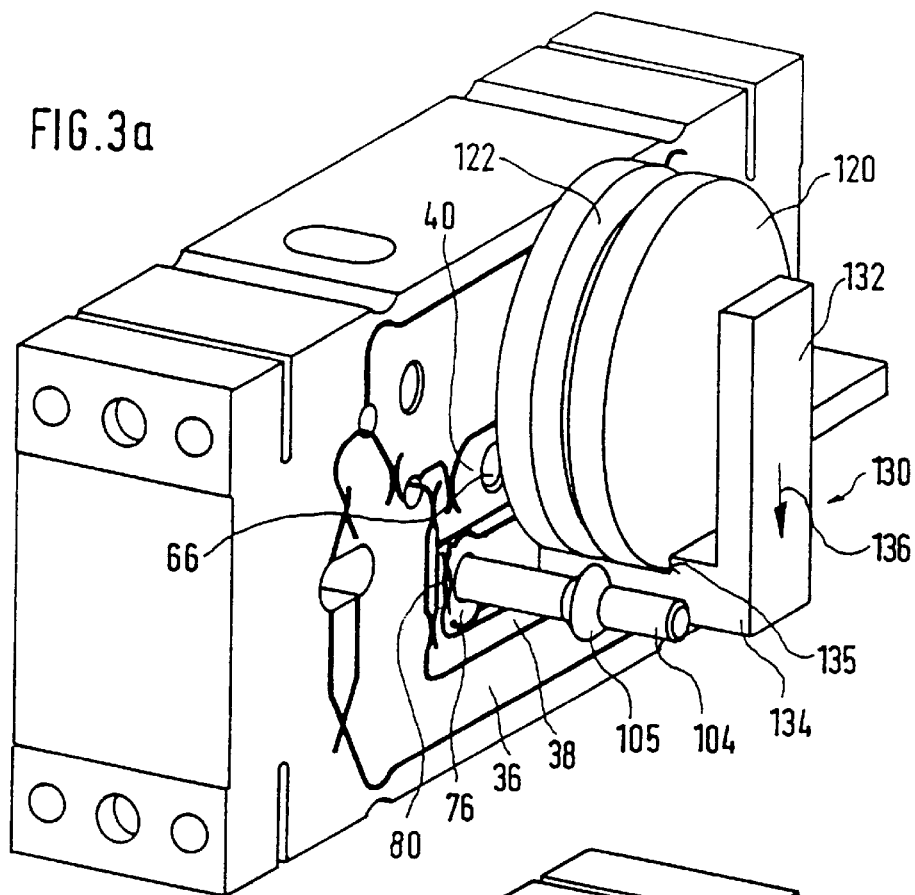
FIGS. 3a and 3b are perspective views of a second embodiment of a holder serving for releasably coupling a calibrating weight to the weighing cell of FIG. 1, shown in two different positions of operation.
Figure 3B:
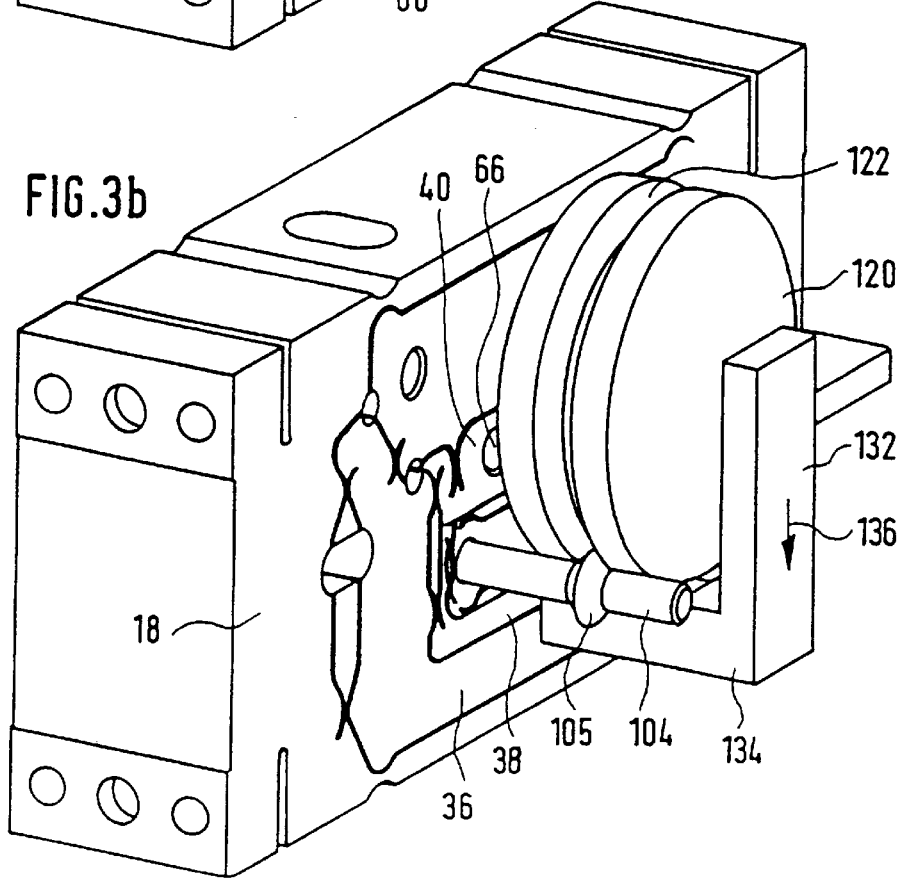

As explained above, the holder 110 illustrated in FIGS. 2a and 2b is capable of locking the calibrating weight 120 in its position separated from the lever mechanism and parallel to the principal surface of the material block 10 by means of the free ends 124 and 126 of the shaft or the recesses 115 and 117 and perpendicularly to the principal surface of the material block 10 by means of the legs 114 and 116. However, this locking action requires a comparatively large holder 110. A comparatively more compact holder 130 is illustrated in FIGS. 3a and 3b. As indicated by an arrow 136, the approximately L-shaped holder 130 can be displaced in the direction of gravity from a first position shown in FIG. 3a for holding the calibrating weight 120 in a position raised from the deflectable member 76 and, thus, from the lever mechanism, into a second position shown in FIG. 3b serving for coupling the calibrating weight 120 to the deflectable member 76 and, thus, to the lever mechanism. In the position shown in FIG. 3b, coupling and locking of the calibrating weight 120 is effected in a similar manner as in the embodiment of FIGS. 2a and 2b by means of the rods 104 and 106 which have the webs 105 and 107, acting together with the groove 122 formed in the outer surface of the calibrating weight 120 complimentary to the webs 105 and 107.

In the position shown in FIG. 3a, a leg 134 of the holder 130 extending approximately perpendicularly to the principal plane of the material block 10 serves as support for the calibrating weight 120 which is raised from the rods 104 and 106. For locking the calibrating weight 120, a step 135 serving as a stop for the calibrating weight 120 is formed at the upper side of the leg 134. The leg 132 of the holder 130 extending approximately in the direction of gravity also prevents a complete tilting of the calibrating weight 120 about an axis extending approximately parallel to the guide members 72 and 74.

In the two embodiments shown in FIGS. 2a and 2b and 3a and 3b, a counter-holder is formed on the housing surrounding the weighing cell and the parts surrounding serving for calibration, wherein, in its raised position shown in FIGS. 2a and 3a, the calibrating weight 120 is held so as to contact the counter-holder and, thus, the calibrating weight 120 is held so that it cannot be displaced. Moreover, in these embodiments, preferably the entire arrangement is constructed symmetrically relative to the principal plane of the material block 10, i.e., on the side of the material block 110 which is not visible in FIGS. 2a and 2b and 3a and 3b, there is also provided an arrangement composed of calibrating weight 120, rods 104 and 106 as well as a holder 110 or 130 corresponding to the arrangement on the side visible in the drawing. This prevents the introduction of torsion forces acting transversely of the principal plane of the material block 10 into the parallelogram guide means 68. However, the latter is not absolutely required. Rather, it has been found that already with an asymmetrical, unilateral arrangement, the coupling of the calibrating weight 120 is sufficiently accurate.

The present invention is not limited to the embodiments shown in the drawing. For example, the calibrating device according to the present invention can also be used in connection with a load receiving means which does not have a parallelogram guide means. Further, the calibrating device according to the present invention can also be used in an advantageous manner in connection with lever mechanisms which produce a force transmission. Finally, an independent coupling of two or more calibrating weights is conceivable.

While specific embodiments of the invention have been shown and described in detail to illustrate the inventive principles, it will be understood that the invention may be embodied otherwise without departing from such principles.

We claim:

1. A balance including a load receiving unit for loads to be weighed, a load measuring unit and a lever mechanism for transmitting force between the load receiving unit and the load measuring unit, the lever mechanism being coupled to the load receiving unit through a coupling area on an input side and to the load measuring unit through a coupling area at an output side, the balance further including a calibrating device comprising an additional coupling area for releasably coupling a calibrating force which is uncoupled during normal weighing operations to the lever mechanism, the additional coupling area being separate from the coupling areas on the input side and the output side, a parallelogram guide means comprising two parallel guide members having first and second ends, a deflectable member for connecting the first ends of the guide member and a stationary member for connecting the second ends of the guide members, the deflectable member being guided so as to be movable parallel to a calibrating force direction and being configured for releasably coupling the calibrating force, the additional coupling area being connected to the deflectable member and the parallelogram guide means being separate from the load receiving unit, further comprising a calibrating weight for producing the calibrating force, and means for coupling the calibrating weight to the deflectable member, wherein the deflectable member comprises a support unit, and wherein the support unit includes receiving areas for the calibrating weight extending essentially transversely of a parallelogram plane of the parallelogram guide means.

2. The calibrating device according to claim 1, wherein the support unit comprises a locking unit for the calibrating weight.

3. The calibrating device according to claim 2, wherein the locking element comprises at least one of a recess and a projection and the calibrating weight comprises at least one of a complimentary projection and recess configured for engagement in the at least one recess and projection of the locking element.

4. The calibrating device according to claim 2, wherein the support unit comprises two support elements extending in a longitudinal direction of the guide members, wherein the support elements are spaced apart from each other and extend essentially parallel to each other.

5. The calibrating device according to claim 4, wherein the support elements are rod-shaped.

6. The calibrating device according to claim 5, wherein the locking element comprises a circumferential web mounted on at least one of the support elements, wherein the web extends coaxially relative to a longitudinal axis of the at least one support element, and wherein the calibrating weight has a recess having an axial sectional shape corresponding to the web.

7. The calibrating device according to claim 6, wherein the web comprises in axial section a triangular shape with a side resting against the at least one support element.

8. The calibrating device according to claim 2, comprising a holder movable between a first position and a second position, wherein the holder in the first position thereof holds the calibrating weight in a position separated from the deflectable member, and wherein the holder in the second position thereof couples the calibrating weight to the deflectable member.

9. The calibrating device according to claim 8, wherein the holder has a contact area for receiving the calibrating weight such that the calibrating weight is supported against the direction of gravity.

10. The calibrating device according to claim 9, wherein the contact area comprises a surface area for supporting the calibrating weight transversely of the direction of gravity.

11. The calibrating device according to claim 8, wherein the holder is mounted so as to be pivotable between the first and second positions thereof about an axis extending perpendicularly to the parallelogram plane.

12. The calibrating device according to claim 8, wherein the holder is deflectable in the direction of gravity between the first and second positions thereof.

13. The calibrating device according to claim 8, wherein the holder is essentially U-shaped with two legs, wherein the calibrating weight is held in the first position thereof between the legs of the holder.

14. The calibrating device according to claim 8, wherein the holder is essentially L-shaped having legs, wherein one of the legs rests in the first position of the holder against an underside of the calibrating weight.

15. The calibrating device according to claim 14, wherein the leg resting against the underside of the calibrating weight extends in the second position of the holder essentially between the support elements.

16. The calibrating device according to claim 1, wherein the additional coupling area is connected in an articulated manner through one bending point to the lever mechanism and through another bending point to the deflectable member.

17. The calibrating device according to claim 16, wherein at least one of the bending points for connecting the additional coupling area is defined at least on one side thereof by a material-free area in the form of a thin cut line.

18. The calibrating device according to claim 1, wherein a transmission ratio of the force transmission between the coupling area on the input side and the coupling area on the output side differs from a transmission ratio of the force transmission between the additional coupling area and the coupling area on the input side.

19. The calibrating device according to claim 1, wherein the lever mechanism comprises at least two levers, wherein the additional coupling area is connected to a lever following a lever including the coupling area on the input side.

20. The calibrating device according to claim 1, wherein the load receiving unit comprises a load parallelogram guide means with two load guide members extending parallel to one another, the load guide member having first and second ends, further comprising a load introduction member connecting the first ends of the load guide members, wherein the load introduction member is guided so as to be capable of parallel displacement, and a stationary post for connecting the second ends of the load guide members.

21. The calibrating device according to claim 20, wherein a portion of the post extends between the load guide members and supports the lever mechanism also arranged essentially between the load guide members.

22. The calibrating device according to claim 21, wherein the lever mechanism is separated from the load receiving unit by a material-free area having at least over portions thereof the form of a thin cut line.

23. The calibrating device according to claim 20, wherein the post forms the stationary member of the parallelogram guide means.

24. The calibrating device according to claim 23, wherein the parallelogram guide means is mounted essentially between the load guide members.

25. The calibrating device according to claim 24, wherein at least one guide member of the parallelogram guide means is separated from at least one of the post and the lever mechanism by a material-free area having at least over portions thereof the form of a thin cut line.

26. The calibrating device according to claim 1, wherein the load receiving unit, the lever mechanism and the parallelogram guide means are constructed in one piece.

27. A balance including a load receiving unit for loads to be weighed, a load measuring unit and a lever mechanism for transmitting force between the load receiving unit and the load measuring unit, the lever mechanism being coupled to the load receiving unit through a coupling area on an input side and to the load measuring unit through a coupling area at an output side, the balance further including a calibrating device comprising an additional coupling area for releasably coupling a calibrating force which is uncoupled during normal weighing operations to the lever mechanism, the additional coupling area being separate from the coupling areas on the input side and the output side, a parallelogram guide means comprising two parallel guide members having first and second ends, a deflectable member for connecting the first ends of the guide member and a stationary member for connecting the second ends of the guide members, the deflectable member being guided so as to be movable parallel to a calibrating force direction and being configured for releasably coupling the calibrating force, the additional coupling area being connected to the deflectable member and the parallelogram guide means being separate from the load receiving unit, wherein a portion of the deflectable member extends between the guide members, wherein the portion of the deflectable member extending between the guide members is over at least sections thereof separated from the guide members by a material-free area in the form of a thin cut line, and wherein the support unit is arranged between the bending point defined by the material-free area in the form of a thin cut line and the bending point opposite the bending point defined by the material-free area in the form of a thin cut line.

28. The calibrating device according to claim 27, wherein each of the guide members has two bending points spaced apart from each in a longitudinal direction of the guide members, wherein the bending points of one of the guide members are located opposite the bending points of another of the guide members, wherein at least one of the bending points is on a side facing an opposite bending point defined by a material-free area whose other side borders the deflectable member and has the form of a portion of a thin cut line convexly arching toward the opposite bending point.

* * * * *